(12) United States Patent
van Haag

(10) Patent No.: US 6,698,341 B2
(45) Date of Patent: Mar. 2, 2004

(54) CALENDER ROLL AND PROCESS FOR OPERATING A CALENDER ROLL

(75) Inventor: Rolf van Haag, Kerken (DE)

(73) Assignee: Voith Paper Patent GmbH, Heidenheim (DE)

( * ) Notice: Subject to any disclaimer, the term of this patent is extended or adjusted under 35 U.S.C. 154(b) by 139 days.

(21) Appl. No.: 09/776,636

(22) Filed: Feb. 6, 2001

(65) Prior Publication Data

US 2001/0016546 A1 Aug. 23, 2001

(30) Foreign Application Priority Data

Feb. 12, 2000 (DE) .......................................... 100 06 299

(51) Int. Cl.⁷ .............................................. B30B 11/22
(52) U.S. Cl. ........................ 100/41; 100/161; 100/168; 100/176
(58) Field of Search .................. 100/155 R, 162 R, 100/163 R, 163 A, 41, 336, 335, 334, 168, 169, 176, 35; 162/100, 207, 202, 214

(56) References Cited

U.S. PATENT DOCUMENTS

| 4,188,698 A | * | 2/1980 | Appenzeller ................ 100/334 |
| 4,570,314 A | * | 2/1986 | Holik et al. ............. 100/162 B |
| 4,900,619 A | * | 2/1990 | Ostrowski et al. .......... 442/382 |
| 4,919,761 A | * | 4/1990 | Schiel et al. ................ 100/153 |
| 5,081,759 A | | 1/1992 | Schiel |
| 5,252,185 A | * | 10/1993 | Ellis et al. ................... 100/330 |
| 5,651,863 A | * | 7/1997 | Van Haag et al. .......... 162/207 |
| 5,768,985 A | | 6/1998 | Lehtovirta et al. |
| 5,911,174 A | * | 6/1999 | Cramer et al. .............. 100/331 |
| 5,915,297 A | | 6/1999 | Lehtovirta et al. |
| 6,305,280 B1 | * | 10/2001 | Beckers ....................... 100/331 |
| 6,454,685 B1 | * | 9/2002 | Onnela et al. ................. 492/16 |

FOREIGN PATENT DOCUMENTS

| DE | 3638070 | 5/1988 |
| DE | 3304076 | 4/1991 |
| DE | 4030190 | 4/1991 |
| DE | 19907078 | 8/2000 |
| EP | 0779394 | 6/1997 |

* cited by examiner

Primary Examiner—Allen Ostrager
Assistant Examiner—Shelley Self
(74) Attorney, Agent, or Firm—Greenblum & Bernstein, P.L.C.

(57) ABSTRACT

A process for operating a calender roll that cooperates rotatingly with at least one other calender roll of a roll stack, at least one calender roll of the roll stack being provided with an elastic cover. The process includes operating the calender roll; and changing a mass of the calender roll during operation. Furthermore, a calender roll is provided including a roll jacket having a first and second end; a supply connection arrangement; and a mass changing device connected to the supply connection.

18 Claims, 3 Drawing Sheets

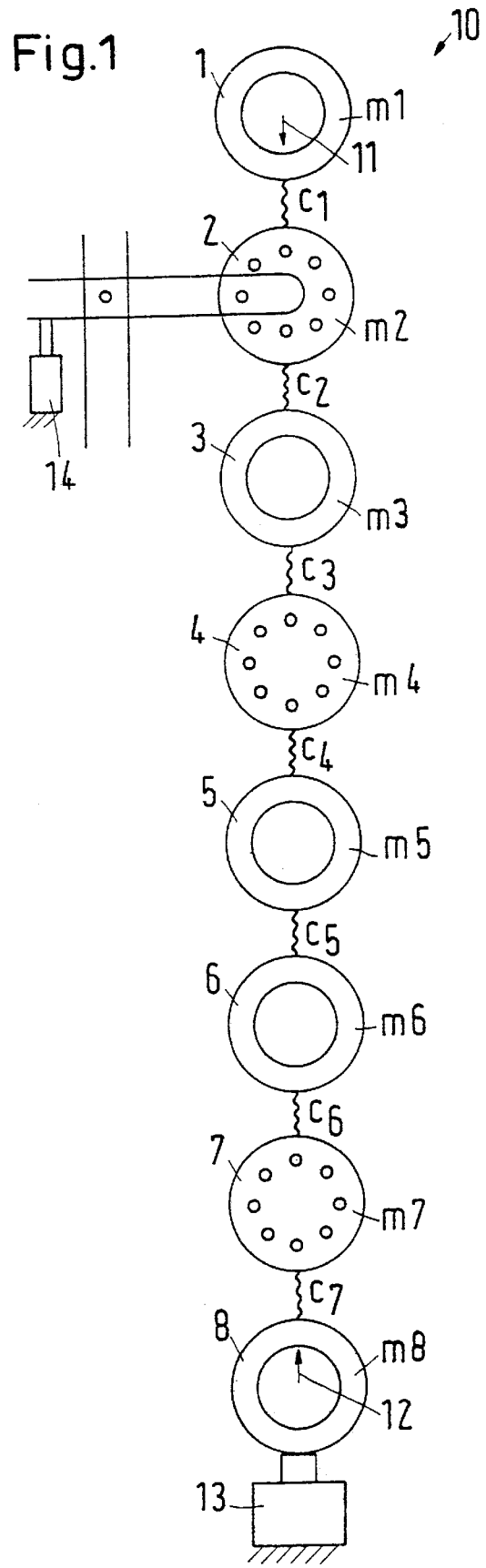

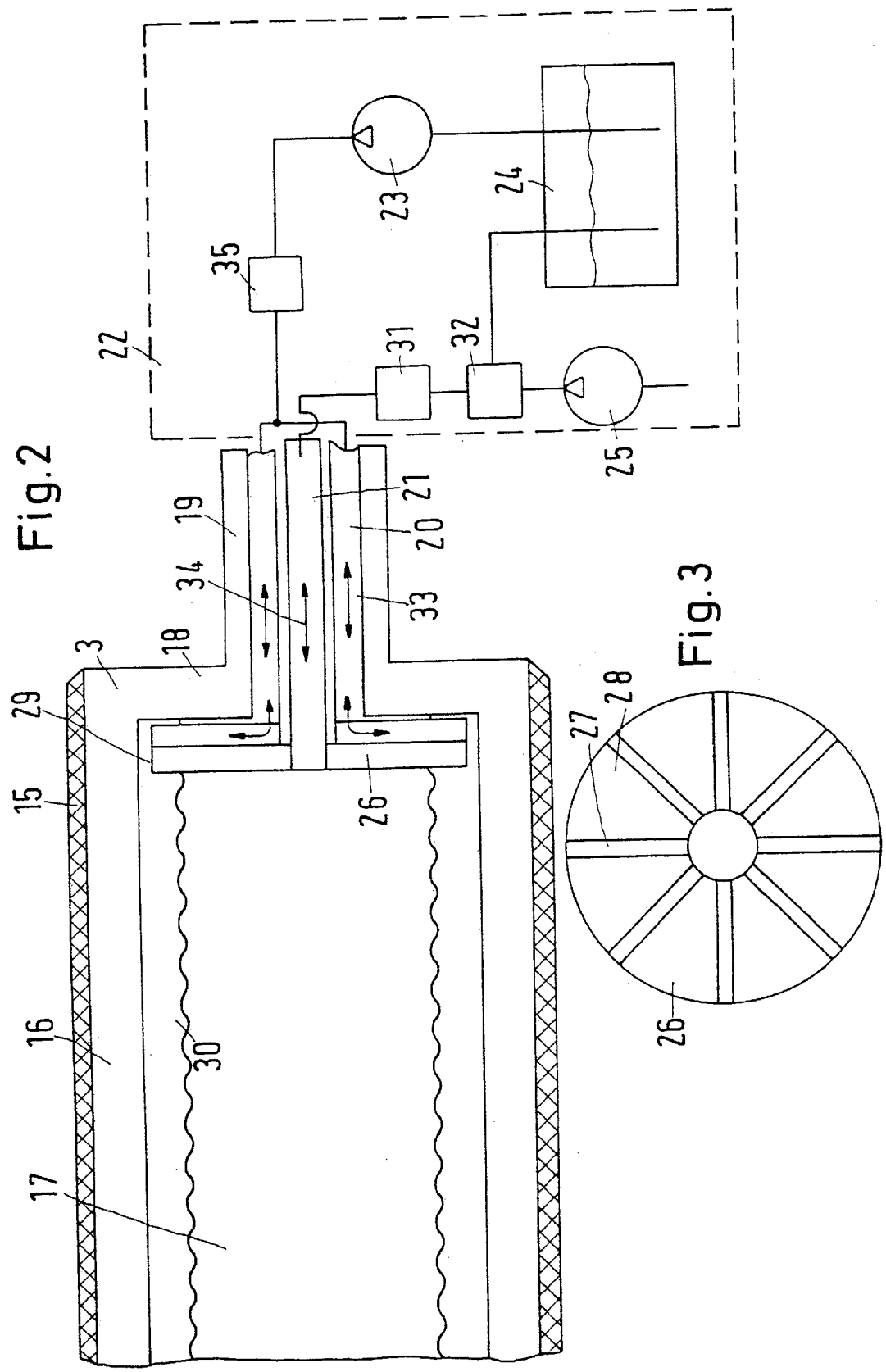

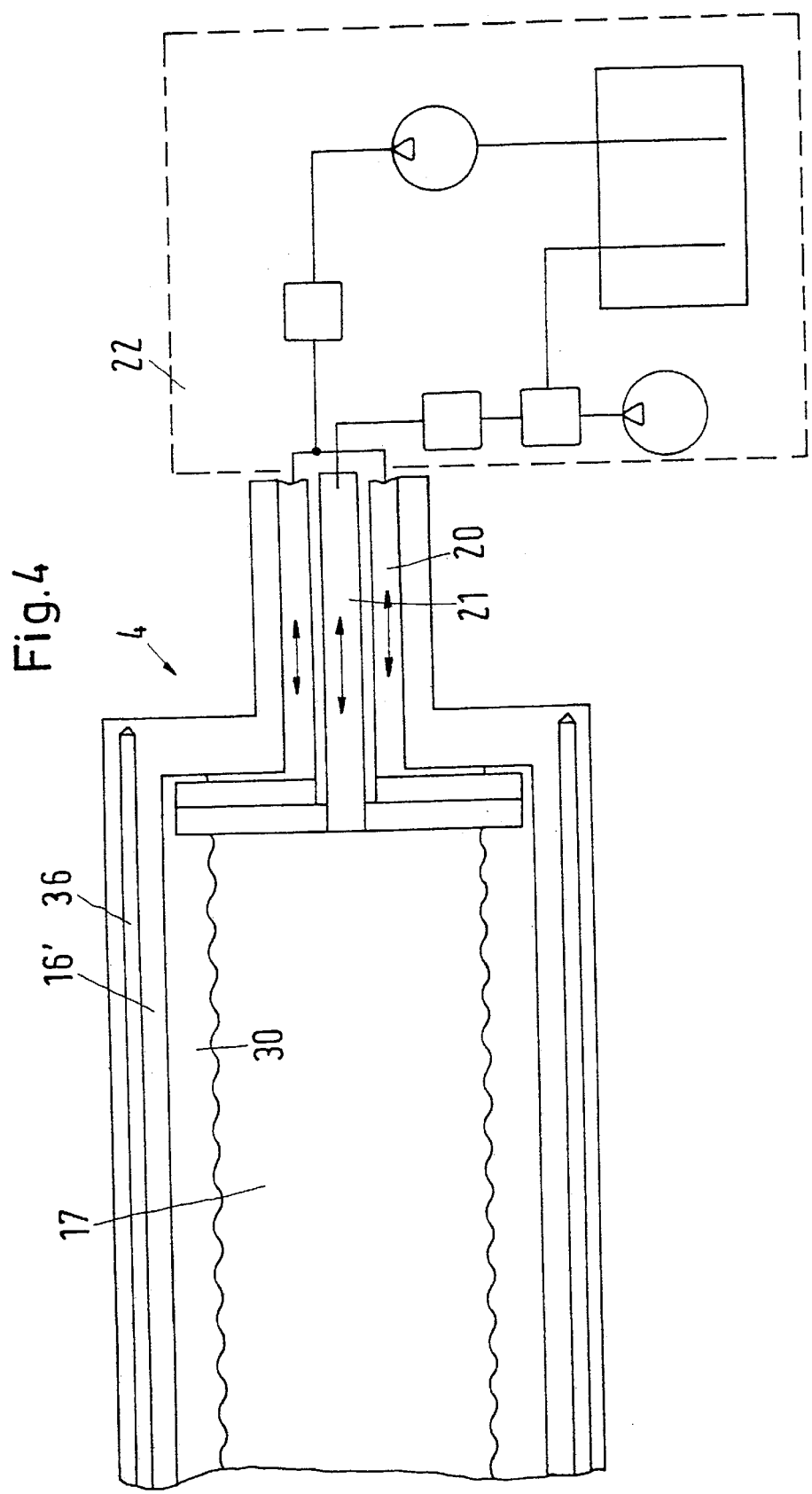

CALENDER ROLL AND PROCESS FOR OPERATING A CALENDER ROLL

CROSS-REFERENCE TO RELATED APPLICATIONS

The present application claims priority under 35 U.S.C. § 119 of German Patent Application No. 100 06 299.7, filed on Feb. 12, 2000, the disclosure of which is expressly incorporated by reference herein in its entirety.

BACKGROUND OF THE INVENTION

1. Field of the Invention

The invention is related to a process for operating a calender roll that cooperates in a rotating manner with at least one other calender roll of a roll stack, with at least one of the calender rolls of the roll stack being provided with an elastic surface. The invention also relates to a calender roll with a roll jacket and a supply connection arrangement.

2. Discussion of Background Information

Such calender rolls are frequently used as the center rolls in a calender; thus, they form a part of a roll stack. Here, neighboring rolls form nips through which a material web is guided in order to be subjected to an increased pressure and perhaps an increased temperature.

Such rolls are broadly used in the processing of a paper web which is used in the following as an example for describing the invention. However, the same problems arise in other material webs as well.

In such calenders so-called "soft" rolls generally cooperate with "hard" rolls. Sometimes two "soft" rolls can also work together. Here, the soft rolls are covered with a plastic cover. It has been observed that, after a certain period of operation, a so-called barring can be observed. This barring appearance, on the one hand, causes an undesired stripe-shaped pattern on the paper web. However, these stripes can also be detected as stripe-shaped markings on the elastic rolls with the plastic covers. The soft rolls become multi-angled, so to speak. At a certain depth or intensity, these bar rings lead to rejections in the material web. Then, the correlating roll or the correlating rolls must be reworked in order to remove the deformation of the plastic cover. This is generally performed by turning the roll on a lathe.

SUMMARY OF THE INVENTION

The invention is based on the aspect of reducing the appearance of barring. This aspect is attained in a process of the type mentioned at the outset by changing the mass of the calender roll during operation. This is based on the following:

A roll stack made up of several rolls has a multitude of frequencies of its own. Among these frequencies there are, e.g., autonomous bending frequencies which are of lesser importance in this case and autonomous oscillation forms that result from the vibrating roll masses on the spring and damper systems which are formed by the plastic covers positioned between the rolls and also by the roll bearings. An operating calender creates exciting forces whose frequencies are connected with the roll rotations and which are equivalent each to a multiple of the roll rotations in a first approximate calculation. These exciting forces can have many sources, e.g., inhomogeneities, anisotropies, or geometric faults. Variations of the thickness of the paper web traveling through the calender can also excite the roll stack. When one of these exciter frequencies meets one of the autonomous frequencies, the oscillation system responds with enlarged oscillations. Due to the multitude of possible exciters and the multitude of possible forms of autonomous oscillations, these points of resonance can virtually not be avoided. In general, the system of oscillations is dampened so much and the exciter forces so small that the resulting oscillation does not disturb immediately. However, over a shorter or longer duration these vibration motions imprint into the plastic surfaces of the elastic roll. It can frequently be observed that the closest integral multiple of the oscillation frequency is imprinted into the rolls as a pattern. This, however, results in a regeneration of the oscillation. The oscillations amplitudes increase exponentially. They result, on the one hand, in an increased sound level [up to more than 115 dB (a)] and, on the other hand, in periodic thickness fluctuations of the passing paper web that leads, as mentioned above, to rejections.

According to the invention, the originating mechanism of the periodic surface waviness is disturbed for avoiding the above-mentioned regenerating effect. In order to avoid a constant integral pattern with a frequency close to the internal frequency of the system being imprinted into the rolls, the oscillation system is modified by changing the mass of the calender roll and changing the correlating internal frequencies. By changing the internal frequencies, it is achieved that the oscillating system cannot be operated with a regenerating frequency over a longer period of time which again can have negative effects, in particular concerning the formation of bar rings. In most cases, in order to change the mass of the calender roll, mass is actually introduced or removed. In some cases, however, it will be sufficient if the mass distribution inside of the calender roll is changed, i.e., shifting, for instance, mass from the radial inside to the radial outside. Such a change affects the inertial momentum, among other things.

Preferably, the mass is changed continuously during operation. It is therefore provided that the mass of the calender roll is continuously increasing or decreasing during operation. Thus, the frequency of resonance is changed continuously so that the formation of a stationary frequency of resonance, which leads to an undesired formation of barring, can be avoided with a relatively high degree of security.

Advantageously, the mass of the calender roll is increased by 10 to 15% of its basic mass. The basic mass is the "empty weight" of the calender, so to speak. It has been discovered that a change of mass of about 10 to 15% of the roll mass can result in a change of the internal frequency of the calender roll in the amount of 4 to 7%. This change is sufficient to avoid the formation of bar rings.

Preferably, a predetermined amount of fluid is introduced during operation and this amount of fluid is then removed again. The change of the mass of a calender roll can be easily achieved with the aid of a fluid. The fluid has the advantage that it spreads relatively quickly over the entire axial length of the calender roll due to the centrifugal force that is present in the interior of the calender roll during operation, so that no localized unbalanced states can occur by introduction or removal of a fluid. The introduction and removal of fluids is known per se, for instance, for heating and cooling. However, in the known cases, it is desired to keep the mass of the fluid that is pumped through constant. According to the invention, it is desired to achieve a change of the mass of the calender roll with the aid of the fluid.

Preferably, the fluid is in contact with the inner wall of the roll jacket. Therefore, the fluid is guided such that it connects vibrationally with the calender roll without creating an air pocket, if possible. This ensures that the fluid mass participates in the oscillating motion. If air were to remain between the fluid and the calender roll, it could oscillate differently than the calender roll itself in a springlike manner due to its compressibility.

Preferably, the fluid is to rotate with the roll. Here, it is perhaps necessary to provide carriers for the fluid in the roll. Thus, the fluid becomes a "part" of the roll in relation to the rotational motion of the roll and thus can be considered as belonging to its mass in any possible way.

Preferably, the fluid is blown out of the roll with the aid of compressed air. Instead of compressed air, however, any other compressed gas can certainly be used. Compressed air is advantageous for reasons of expense, however. This omits the expensive pumping mechanism that either pumps the fluid out of the interior of the calender roll or suctions it out. With the aid of pressed air, it can be provided that, even when the calender roll is being emptied, i.e., during removal of the fluid, the contact between the fluid and the calender roll remains.

Preferably, the appearance of air in the fluid removal pipe is used as the signal for another filling of the calender roll with fluid. Thus, expensive control devices are omitted that monitor whether if the calender roll is sufficiently emptied. It is only necessary to check if any air is present in the fluid removal pipe which, by the way, can be identical to the fluid introduction line. This control can, for instance, be performed such that the pressure difference of the removal air is determined. The very moment sufficient amounts of fluid have been removed from the calender roll, the air being able to move freely from the entrance to the exit, so to speak, a drastic pressure drop occurs that can be used as a signal that the roll has now been sufficiently emptied.

Advantageously, the fluid may be tempered. The fluid can therefore be either heated or cooled. In particular when the calender roll itself is provided with an elastic surface of cover, it is possible, with the aid of fluid, to remove heat that develops, e.g., by the flexing work of the elastic cover. Since the heat is not removed evenly but almost in batches, a constant temperature can be achieved in this manner only in exceptional cases. However, this is not necessary here since it is essentially only important to prevent an overheating of the cover.

Preferably, the change in mass of the calender roll is compensated by sagging compensation rolls and/or weight compensations cylinders of the calender roll. When the mass of the calender roll is increased by introducing foreign mass, certainly the relations change as well, in particular the pressure in the separate nips of the roll stack. This per se undesired effect can be compensated, however, by the control of the upper and lower sagging compensation rolls positioned in the roll stack and the weight compensation cylinder of the center rolls that are provided nowadays in the overwhelming majority of modern calenders.

An aspect of the invention is also attained in a calender roll of the above-mentioned type such that a supply connection arrangement is connected with a mass changing device. A supply connection arrangement is known from rolls that are heated or cooled by a tempered fluid. However, this aspect is only of minor importance in the present invention. According to the invention, the supply connection arrangement provides the changing of the mass of the calender roll by introduction or removal of an "alien mass." Thus, the oscillation system of the roll stack is influenced and changes the natural frequency continuously or from time to time. This disturbs the development of resonant frequencies and the formation of bar rings is omitted or at least drastically reduced.

Preferably, the mass changing device alternatingly introduces air and a fluid into the supply connection arrangement. When the fluid is introduced, the mass changes. Here, it is particularly preferred that the mass changing device displaces the fluid with the aid of air. Thus, the air can be used for reducing the mass of the calender roll.

Preferably, the introduction devices of the fluid and the air are positioned opposite one another. There is a fluid pipe and an air pipe, so to speak. This is advantageous in enabling the provision of a pump (or any other pressure creating device) for each pipe adjusted to each fluid. Complicated valves or other control mechanisms can largely be omitted.

Preferably, the supply connection arrangement is provided with a fluid connection positioned opposite to a damming disc that comes close to the inner wall of the roll jacket up to a gap of a predetermined thickness. This damming disc ensures that the fluid introduced via the fluid connection is immediately guided radially to the outside and, due to the gap, contacts the inner wall of the roll jacket. Thus, air is prevented from remaining in the system between the roll jacket and the fluid. In this case, only a small part of the fluid mass would participate directly in the oscillation. The remaining part could be "dampened" by the air.

Here, it is preferred that the supply connection arrangement is provided with an air connection that penetrates the damming disc. Then, the introduced air acts radially from the inside towards the outside onto the fluid contacting the inner wall of the roll jacket and can push it back through the gap between the damming disc and the inner wall of the roll jacket. The two media air and fluid have accordingly defined pressure impact directions with which the increase and the reduction of the mass of the calender roll can be controlled very well.

Preferably, radially directed grooves are provided between the damming disc and the roll nip. This has the advantage that the introduced fluid is immediately accelerated in the rotational direction of the calender roll, as well. In relation to the calender roll, the introduced fluid then remains stationary in the calender roll.

Advantageously, a fluid sensor may be provided in the air connection. The filling process can easily be stopped thereby and be valued as the correlating signal when larger amounts of fluid seep out of the air pipe. It is also advantageous when an air sensor is provided in the fluid connection. This sensor can be used for controlling the removal process. It is finished when air exits the channels of the damming disc and thus enters the fluid connection.

Alternatively or additionally, the mass changing device can be provided with a pressure sensor for the air influx. When air exits through the channels of the damming disc, it occurs with a measurable difference in pressure which can be used as a controlling signal for the switching off of removal process. In a similar way, the filling process can certainly also be controlled by a measurable difference in pressure of exiting water into the air of the air pipe.

According to an aspect of the present invention a process for operating a calender roll that cooperates rotatingly with at least one other calender roll of a roll stack, wherein at least one calender roll of the roll stack is provided with an elastic cover, is disclosed. The process includes operating the calender roll and changing a mass of the calender roll during operation.

According to another aspect of the present invention, the mass of the calender roll is continuously changed during operation. Additionally, other aspects of the present invention include increasing the mass of the calender roll by 10% to 15% of its basic mass.

In yet another aspect of the invention, a predetermined amount of fluid is introduced during operation and the predetermined amount of fluid is then removed again. In another aspect of the present invention, the fluid contacts the interior wall of the roll jacket. According to a further aspect of the present invention, the fluid rotates together with the roll.

In another aspect of the present invention, the fluid is blown out of the roll with the aid of compressed air. According to a still further aspect of the present invention, an appearance of air in a fluid removal pipe is used as a signal for filling the calender roll with fluid again.

Further aspects of the invention include the use of a fluid which is tempered. According to other aspects of the present invention, the fluid is liquid. Other aspects of the present invention include wherein the change of mass of the calender roll is compensated by at least one of sagging compensation rolls and weight compensation cylinders of the calender roll. According to another aspect of the present invention, operating the calender roll comprises rotating the calender roll about a longitudinal axis.

According to a further aspect of the present invention, a calender roll is provided including a roll jacket having a first and second end; a supply connection arrangement; and a mass changing device connected to the supply connection. According to a still further aspect of the invention, the mass changing device introduces air and fluid into the supply connection arrangement in an alternating sequence.

Additionally, other aspects of the present invention include a mass changing device that displaces the fluid with the aid of air. In yet another aspect of the invention, the calender roll further includes an air introduction device and a fluid introduction device positioned opposite to one another. In another aspect of the present invention, the supply connection arrangement is provided with a fluid connection that is positioned opposite to a damming disc which is positioned relatively close to an inner wall of the roll jacket to form a gap of predetermined thickness.

In another aspect of the present invention, the supply connection arrangement is provided with an air connection that permeates the damming disc. According to a further aspect of the present invention, the roll jacket further includes a roll pin connected to each of first and second end.

In another aspect of the present invention, radially running channels are positioned between said damming disc and said roll pins. According to a still further aspect of the present invention, a fluid sensor is provided within the air connection. Further aspects of the invention include an air sensor that is provided within the fluid connection. According to other aspects of the present invention, the mass changing device is provided with a pressure sensor for sensing air introduction.

According to another aspect of the present invention, a process is provided for operating a first calender roll that cooperates rotatingly with at least a second calender roll of a roll stack, wherein at least one calender roll of the roll stack is provided with an elastic cover.

The process may include operating the roll stack, including the first calender roll; monitoring oscillation forms and exciting forces of the roll stack while the first calender roll is operating; and changing the mass of the first calender roll during operation to modify the oscillation forms and exciting forces of the roll stack. The influence of mass variation of the first calender roll is calculated by activation of a natural frequency of a mono mass oscillator defined by the first calender roll, determined by the formula, $\omega^2 = c/m$, wherein: $\omega$ equals circular frequency of the first calender roll and is further defined as $\omega = 2 \cdot \pi \cdot f$; f equals frequency of the first calender roll; c equals spring stiffness of the first calender roll; and m equals oscillating mass of the first calender roll.

In yet another aspect of the present invention, a resulting natural frequency of the first calender roll after a change of the mass of the first calender roll is defined as: $\omega^2 = c/(m + \Delta m)$; wherein $\Delta m$ equals the change of mass of the first calender roll.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

In the following, the invention is described together with the drawing using preferred exemplary embodiments. Shown are:

FIG. 1 a schematic view of a calender with measurements for describing the oscillations, FIG. 2 a schematic cross section through a calender roll, FIG. 3 a top view onto the damming disc and FIG. 4 a lengthwise section of a modified embodiment of a calender roll.

DETAILED DESCRIPTION OF THE PRESENT INVENTION

The particulars shown herein are by way of example and for purposes of illustrative discussion of the embodiment of the present invention only and are presented in the cause of providing what is believed to be the most useful and readily understood description of the principles and conceptual aspects of the present invention. In this regard, no attempt is made to show structural details of the present invention in more detail than necessary for the fundamental understanding of the present invention, the description taken with the drawings making apparent to those skilled in the art how the several forms of the present invention may be embodied in practice.

FIG. 1 depicts schematically a calender 10, i.e., a stack of calender rolls 1–8 positioned on top of each other. The uppermost roll 1 and the lowermost roll 8 are embodied as sagging compensation rolls. The second, fourth, and seventh intermediate rolls, seen from above, are embodied as heating rolls with the third, fifth, and sixth rolls being embodied as elastic rolls. Neighboring rolls each form a nip between one another, which is used for processing a material web, i.e., for exposing a material web not described in detail with pressure and perhaps with a risen temperature. In addition to the sagging compensation rolls with their hydraulic support elements 11, 12 for control possibilities, a cylinder 13 is provided underneath the calender 10 as well as a weight compensation cylinder 14 for each center roll 2–7, if necessary, depicted for reasons of clarity only for the center roll 2. The calender frame was also omitted.

Each of the rolls 1–8 is provided with a roll mass m1–m8. To keep it simple, it shall be assumed that only neighboring rolls are each connected by a spring with the spring stiffness c1–c7. Thus, the calender 10 forms a system of multi-mass oscillators. Thus, a correlating number of natural frequencies result during operation, each of which can lead to a resonance, when an impulse frequency of the same dimension is present. It is suspected that in certain resonant frequencies a barring can develop that is expressed in the material web to be processed in a series of lines. Particularly on the elastic rolls 3, 5, 6, it can be observed that these rolls are provided with a multiple angularity according to the line distance. However, this multiple angularity and the line formation appear only after a certain duration of operation. It can be observed, that in the event of operational malfunctions, i.e., with the appearance of different frequencies, the multiple angularity vanishes or is deformed. Therefore, attempts have been made to influence the natural frequency and arrived at the object of changing the mass of at least one roll.

It could be determined in an operating calender that an elastic center roll 3 oscillates between two heated rolls 2, 4 with a frequency of f=430 Hz. The mass of the roll is 1387 kg/m in relation to one meter. The influence of the mass variations can easily be estimated by the simple activation of the natural frequency of a mono mass oscillator $\omega^2=c/m$.

Here:

$\omega$ = the circular frequency($\omega = 2 \cdot \pi \cdot f$), $c$ = the spring stiffness $m$ = the oscillating mass.

Here, the measured natural frequency and the roll mass results in a spring stiffness that, e.g., origins from the compression behavior of the elastic covers. The spring stiffness here resulted approximately at $C=10^{10} N/m/m$.

This is essentially equivalent to the stiffness of two parallel connected single spring stiffness of a plastic cover. If it is assumed that the spring stiffness does not change by a change of the mass (this can very well be assumed in the preliminary calculations), the same model calculation can be used to calculate the resulting natural frequency after a change of the mass of the roll $\omega^2=C/(m+\Delta m)$.

In order to change the mass, it was opted to introduce a certain amount of fluid into the roll or to remove it after a certain duration of operation. The amount of fluid that can be inserted into the center roll 3 is $\Delta m=195$ kg/m. This results in a new natural frequency of 402.6 Hz. By changing the mass of the roll by 14%, the natural frequency therefore changes by 6.4%.

At a production speed of 1200 m/min and an outer circumference of the roll 3 of 717 mm, this results in a barring pattern change from 48.4 to 49 to 45.3 to 45. In this case, due to the position of the phases of the oscillation movements of the rolls to each other only odd integral multiples effect the center roll.

In order to change the mass of the roll, a fluid is used, preferably water. However, the term fluid as used in the specification, is intended to embrace any fluid material, including a variety of liquids or fluid particulates. Here, the change of the roll mass must occur relatively quickly so that no distinct patterns can be imprinted into the elastic cover. The invention is further explained using the exemplary embodiment depicted in FIGS. 2 and 3.

The roll 3 is provided with an elastic cover 15. The elastic cover is provided on a roll jacket 16 that encircles a hollow space 17. On its faces, the inner space is closed by nip discs 18 that turn to roll nips 19. The roll nips 19 are provided with a supply connection arrangement in a manner known per se containing a first channel 20 and a second channel 21. The two channels 20, 21 form a supply connection arrangement and are connected with a mass changing device 22 via a rotation provider. The mass changing device 22 is provided with a fluid pump 23 which is positioned between the first channel 20 and a fluid reservoir 24. The pump 23 is also able to pump the fluid from the fluid reservoir 24 into the inner space 17 of the calender roll 3.

The mass changing device 22 is also provided with a second pump that compresses air. This pump 25 is connected with a second channel 21 which is also directed toward the inner space 17. The pump 25 is also able to fill the inner space 17 with pressed air.

A damming disc 26 is provided at the position where the first channel 20 runs into the inner space 17 of the calender roll 3. The damming disc 26 rotates along with the roll jacket 16. It is provided on its side facing the first channel with ribs 27 that form channels 28 between each other running radially outward. Fluids introduced into the space between the damming disc 26 and the pin disc 18 are therefore guided radially outward by the ribs 27 and simultaneously accelerated to the rotation of the calender roll 3. The second channel 21 penetrates the damming disc 26, ends therefore about in the radial center of the inner space 17.

The damming disc 26 forms a relatively narrow gap 29 to the inner wall of the roll jacket. This gap 29 is sized such that fluid introduced through the first channel 20 and the channels 28 immediately contacts the inner wall of the roll jacket 16. It is therefore avoided that air remains between the fluid and the roll jacket 16.

When the pump 23 is operated and pumps fluid from the reservoir into the inner space 17, a fluid layer 30 develops at the inner side of the roll jacket. The fluid is always pressed radially outward due to the rotation of the calender roll 3. Filling the calender roll 3 with fluid can continue until the calender roll 3, more precisely its inner space 17, is almost completely filled and the fluid exits through the second channel 21. This state is determined by a sensor 31 which then switches a valve 32 in order to redirect further exiting fluid into the reservoir 24. Simultaneously, the sensor 31 switches the pump 23 off and switches the pump 25 on. Thus the fluid 30 is displaced from the inner space 17 of the calender roll 3 and flows back to the reservoir 24 through the first channel 20. In both the first channel 20 as well as in the second channel 21 the flow direction of fluid and/or air reverses which is implied by the double arrows 33, 34.

The evacuation of the inner space 17 of the calender roll 3 continues until air flows through the first channel 20. This can be determined by a sensor 35 which then switches the pump 23 on and switches the pump 25 off. Perhaps the sensor 35 in the pipe between the reservoir 24 and the first channel 20 can be omitted when a change in pressure is determined by the second pump 25. Namely, when the entire fluid has been removed from the inner space 17 a distinct pressure change occurs in the first channel 21.

The filling and evacuation can occur relatively quickly. One cycle can be finished, e.g., within less than one or two minutes. Since, by adding and removing fluids, the mass of the calender roll 3 is continuously increased or decreased, an according change in natural frequency, as above described, can be achieved and, thus, the formation of longer lasting resonant frequencies be avoided.

However, the user is not limited to the effect of mass changing in the elastic rolls 3, 5, 6. Even when a mass change is performed on a heating roll, corresponding development of bar rings can be omitted or at least reduced in the elastic rolls 3, 5, 6. FIG. 4 shows a heating roll 4 with the same elements as the soft roll 3, having been provided with the same reference characters. Corresponding elements are provided with the same reference characters.

The roll jacket 16' is provided with peripheral bores 36 in which a heat conducting medium circulates. The heat carrying matter is at the other end introduced or removed, e.g. Here, the elastic cover is omitted. In such a roll 4, the inner space 17 can also be filled alternating with air or with fluid which results in mass changes of approximately 10 to 15%.

Fluids that are introduced into the inner space 17 and are again removed from there can certainly also be used in order to transport a certain amount of heat from the inside toward the outside. In particular, in a calender roll 3 having an elastic cover 15, the fluid can be used to remove heat created by compression work, for example. However, this heat removal does not occur continuously. It is sufficient, though, to prevent an overheating of the cover 15. A main aspect, however, is the change of the mass of the calenders 3, 4.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention extends to all functionally equivalent structures, methods and uses, such as are within the scope of the appended claims.

What is claimed is:

1. A process for operating a calender roll arranged to rotatingly cooperate with at least one other calender roll of a roll stack, in which the roll stack includes at least one calender roll with an elastic cover, the process comprising:
   operating the calender roll; and
   changing a mass of the calender roll during operation.

2. The process according to claim 1, wherein the mass of the calendar roll is continuously changed during operation.

3. The process according to claim 1, wherein the mass of the calender roll is increased by 10% to 15% of its base mass.

4. The process according to claim 1, wherein a predetermined amount of fluid is introduced during operation and the predetermined amount of fluid is then removed again.

5. The process according to claim 4, wherein the fluid contacts an interior wall of a roll jacket of the calender roll.

6. The process according to claim 4, wherein the fluid rotates together with the calender roll.

7. The process according to claim 4, further comprising blowing the fluid out of the calender roll with the aid of compressed air.

8. A process for operating a calender roll that cooperates rotatingly with at least one other calender roll of a roll stack, at least one calender roll of the roll stack being provided with an elastic cover, the process comprising:
   operating the calender roll; and
   changing a mass of the calender roll during operation,
   wherein a predetermined amount of fluid is introduced during operation and the predetermined amount of fluid is then removed again, and
   wherein an appearance of air in a fluid removal pipe is used as a signal for filling the calender roll with fluid again.

9. The process according to claim 4, wherein the fluid is tempered.

10. The process according to claim 9, wherein the fluid is liquid.

11. The process according to claim 1, wherein the roll stack further includes sagging compensation rolls and the calender roll includes weight compensation cylinders, and the process further comprises compensating the change of mass of the calender roll via the at least one of sagging compensation rolls and the weight compensation cylinders of the calender roll.

12. The process according to claim 1, wherein operating the calender roll comprises rotating the calendar roll about a longitudinal axis.

13. A process for operating a first calender roll that cooperates rotatingly with at least a second calender roll of a roll stack, wherein at least one calender roll of the roll stack is provided with an elastic cover, the process comprising:
   operating the roll stack, including the first calender roll;
   monitoring oscillation forms and exciting forces of the roll stack while the first calender roll is operating;
   changing the mass of the first calender roll during operation to modify the oscillation forms and exciting forces of the roll stack;
   wherein an influence of mass variation of the first calender roll is calculated by activation of a natural frequency of a mono mass oscillator defined by the first calender roll, determined by the formula, $\omega^2 = c/m$, wherein:
   $\omega$ equals circular frequency of the first calender roll and is further defined as $\omega = 2 \cdot \pi \cdot f$;
   f equals frequency of the first calender roll;
   c equals spring stiffness of the first calender roll; and
   m equals oscillating mass of the first calender roll.

14. The process according to claim 13, wherein a resulting natural frequency of the first calender roll after a change of the mass of the first calender roll is defined as:
   $\omega^2 = c/(m + \Delta m)$;
   wherein $\Delta m$ equals the change of mass of the first calender roll.

15. The process according to claim 1, wherein the at least one calender roll of the calender roll stack includes the at least one calender roll having an elastic cover.

16. The process according to claim 13, wherein the first calender roll includes the at least one calender roll having an elastic cover.

17. A process for operating a calender roll stack that includes at least one calender roll that cooperates rotatingly with at least one other calender roll, the process comprising:
   operating the calender roll stack; and
   changing a mass of the at least one calender roll during operation of the calender roll stack.

18. The process according to claim 17, wherein the at least one calender roll comprises a calender roll with an elastic cover.

* * * * *